UNITED STATES PATENT OFFICE.

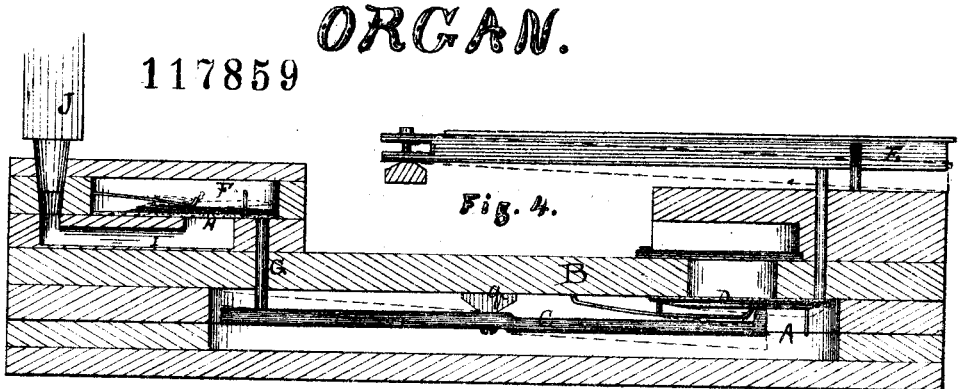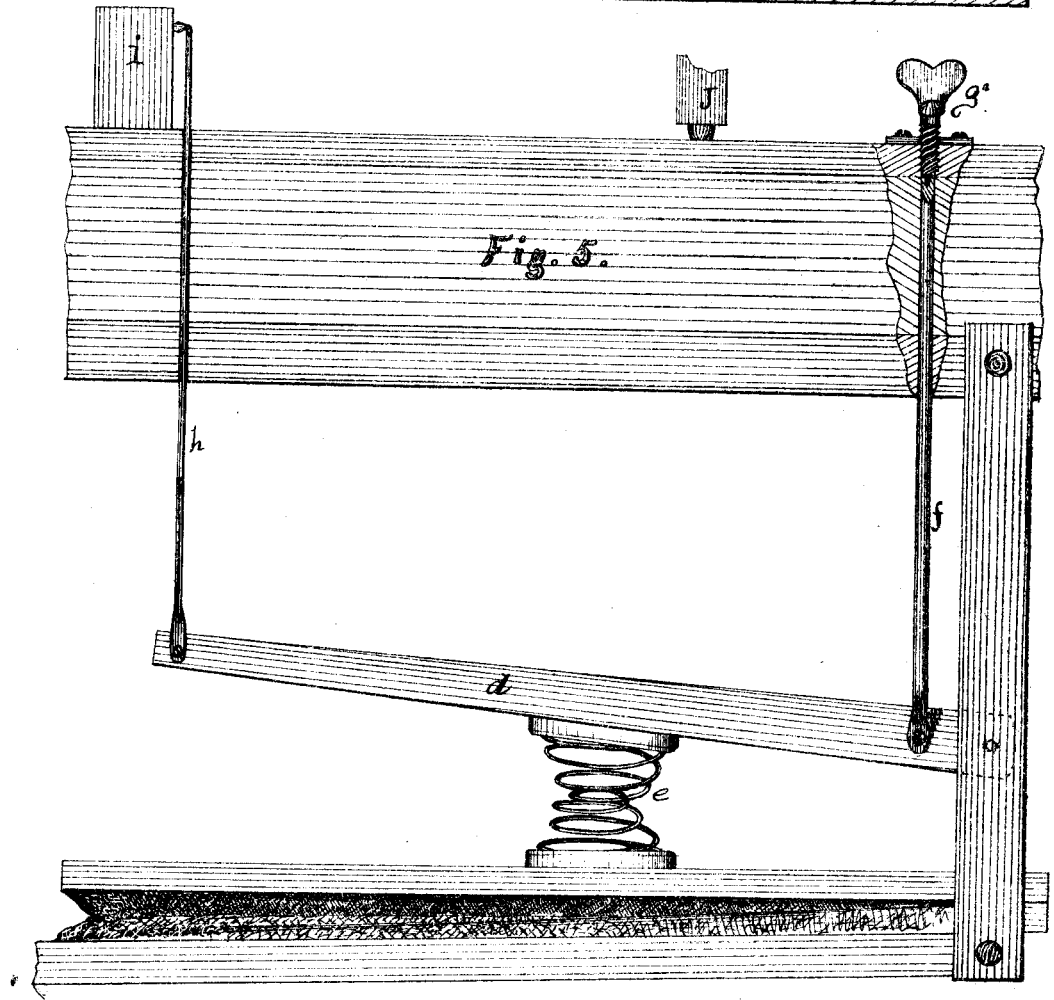

RILEY BURDETT AND BENJAMIN O. CHURCH, OF CHICAGO, ILLINOIS.

IMPROVEMENT IN ORGANS.

Specification forming part of Letters Patent No. 117,859, dated August 8, 1871; antedated August 5, 1871.

*To all whom it may concern:*

Be it known that we, RILEY BURDETT and BENJAMIN O. CHURCH, of Chicago, in the county of Cook and State of Illinois, have invented a new and useful Improvement in Organs; and we do hereby declare the following to be a full, clear, and exact description of the same, reference being had to the accompanying drawing, in which—

Figure 1 is a perspective view of a portion of our organ, the case being removed. Fig. 2 is a vertical cross-section of the pipe wind-chest; Fig. 3, a perspective view of the pressure-valve action; Fig. 4, vertical cross-section, showing reed-and-pipe "action;" Fig. 5, rear elevation, showing the pressure-regulating device.

This invention relates more particularly to organs wherein are combined free reeds and organ-pipes, though some portions of it are applicable to organs having pipes only; and it consists: First, in an automatic cut-off valve, to prevent the passage of wind from the bellows except under pressure. Second, in an independent blow-pedal for the organ-pipes. Third, in the manner of adjusting the bellows pressure to correct the pitch when the same has been changed by variation of temperature.

That part of this organ wherein the tones are produced by reeds is made in the usual manner, with the common suction-bellows. The vertical position for said bellows is the most convenient, and it may be operated by the blow-pedals, as generally arranged. An independent pedal for the pipes may be placed on either side of the others, so that, if desirable, one foot may easily move that and one of the pedals of the suction-bellows also. The suction-bellows is not shown. The pipes and wind-chest, upon which they are placed, are located at the back part of the organ. The wind-passage I, from the valves H, leads in radial directions to such points as it may be convenient to locate the organ-pipes J. The valves H must necessarily be equidistant and directly behind valves D; but the pipes J cannot be placed within the same linear space, and it is therefore necessary to adopt an arrangement more or less irregular, and lead the passages I to the pipes J. It is well known to those who are familiar with organs that the tones produced when the bellows first moves and those produced at the moment of exhaustion are deficient and are unmusical. We have devised an automatic cut-off valve, to prevent the entrance of air to the wind-chest until full pressure has accumulated in the bellows, and to cut off the same before the bellows has become exhausted. The pipes will therefore be prevented from speaking except under the proper pressure of wind. This cut-off valve K is located in the wind-trunk L. It is shown in perspective in Fig. 3, the trunk being represented as though it were transparent. The valve K is mounted at the end of a lever, $k$, which has its fulcrum in two small blocks secured to the cover of the trunk L, and is operated by means of an arm, M, which projects from a rock-shaft, N. The end of said shaft forms a crank, $n$, outside of the trunk L. When the crank $n$ is depressed the valve K is raised from its seat and the air is permitted to pass into the trunk O and thence to the wind-chest F, and when said crank is raised the valve K closes upon its seat and cuts off the passage of wind. These motions of the crank $n$ are made automatic, and secured at the proper times by means of a long lever, P, which may be pivoted to the center-board of the bellows as shown, or to any other convenient stationary part of the instrument. It is connected to the crank $n$ by means of a link, $p$, and it is operated by means of two studs, Q R, fixed upon the bellows, the one to open said valve after the bellows has commenced to be inflated, and the other to close the same before the bellows has become completely exhausted. When the bellows has been raised sufficiently far to have produced some pressure its further movement causes the stud Q to strike the lever P and push it up so as to open the valve K. The lever P remains in that position until forcibly depressed by the stud R just before the bellows has become completely exhausted. S J represent the ordinary pedals by which the reeds are sounded. The exhaust-bellows is not shown in the drawing. By the side of one of the pedals S T, I place an extra pedal, U, which may be connected to the pipe or pressure-bellows by means of the rock-lever V or some equivalent mechanism. The advantage of this extra pedal is, the facility with which the pressure-bellows may be operated when the pipes are required to sound, and left at rest when the reeds only are to be used. The same foot can operate both of the pedals S and U, or the pedals S and T may be operated by one foot, while the other is at lib.

erty to operate the pedal U alone. It has been discovered that variations of temperature affect the "pitch" of organ-pipes, so that when the same are tuned in accord with free reeds a thermal change of a few degrees will cause them to produce a sensible discord. It has also been discovered that the pitch of an organ-pipe may be caused to change by increasing or diminishing the bellows pressure; but heretofore it has only been possible to correct the pressure by means of the ear. We have devised a method of producing the necessary adjustment without sounding the instrument, which would be frequently inconvenient. For this purpose we place above the bellows a lever, $d$, pivoted at one end to some stationary part of the instrument. Between said lever and the top of the bellows is a carefully-adjusted spring, $e$. The tension of said spring may be increased or diminished by depressing or raising the free end of the lever $d$, and said lever is placed under the control of the performer by means of the rod $f$, which is pivoted to said lever and extends up through the casing of the instrument to some point convenient to the hand of the performer. A thumb-screw, $g$, serves to move the rod $f$ and lever $d$ in the direction desired. The rod $f$ is pivoted to the lever $d$ near to the pivot of said lever, so that the greatest movement of the lever may be effected by a small movement of the screw $g$. If it should be necessary to remove the lever $d$ it would be inconvenient to detach the screw $g$, and we have therefore made said screw separate, and connect them only by a pointed end of the screw entering a corresponding socket in the end of the rod $f$, as shown in Fig. 5. The free end of the lever $d$ is extended some distance beyond the spring $e$, and at the extremity of said lever we place an index-rod, $h$, which is extended upward to some point in view of the performer, and the end of said index-rod is arranged to traverse over a graduated scale, $i$, as the lever $d$ may be moved up or down. The scale $i$ is graduated to correspond to degrees of temperature as indicated by the thermometer, one of which must be kept in the room occupied by the instrument, and may conveniently be placed by the side of the scale $i$, as shown in Fig. 1. When the instrument is tuned the lever $d$ is adjusted so that the point of the index-rod rests upon the point marked to correspond to the temperature of the room at the time. At any subsequent time, if the performer finds a different temperature he has but to adjust the bellows-pressure, by means of the screw $g$ and lever $d$, until the index $h$ rests upon the point on the scale $i$ marked to correspond to the present temperature, and he will be sure that the pitch of his pipes has been brought to accord with the reeds of his instruments. The proper graduation of the scale $i$ can only be arrived at by actual trial; but practically no great difficulty is experienced in securing it.

Having described our invention, what we claim as new is—

1. In combination with the bellows of an organ, the cut-off valve K, or its equivalent, connected with said bellows by suitable mechanism to make said valve automatic, to prevent the flow of wind to the pipes except when under bellows pressure sufficient to produce a proper tone, as set forth.

2. The independent blow-pedal U, in connection with the pedals S T and an independent pressure-bellows for the organ-pipes.

3. The adjusting-screw $g$ and rod $f$ connected as described, and combined with the lever $d$ and spring $e$, substantially as set forth.

4. The temperature-index $h$, in combination with the adjustable pressure-lever $d$ and adjusting-screw $g$, or their equivalents, to operate as and for the purposes set forth.

5. The pressure or cut-off valve K, in combination with the lever P and studs Q and R attached to the upper and lower parts of the bellows of a pipe-organ, for the purpose set forth.

RILEY BURDETT.
B. O. CHURCH.

Witnesses:
I. T. PACKARD,
F. J. BURDETT.